United States Patent [19]

Nishimura et al.

[11] Patent Number: 4,622,254

[45] Date of Patent: Nov. 11, 1986

[54] FIBER MATERIAL FOR REINFORCING PLASTICS

[75] Inventors: Akira Nishimura, Otsu; Kunio Maeda, Omihachiman; Kazuo Kito, Kyoto, all of Japan

[73] Assignee: Toray Industries, Inc., Tokyo, Japan

[21] Appl. No.: 765,989

[22] Filed: Aug. 14, 1985

Related U.S. Application Data

[63] Continuation of Ser. No. 410,054, Aug. 20, 1982, abandoned.

[30] Foreign Application Priority Data

Aug. 31, 1981 [JP] Japan .................. 56-136301
Nov. 19, 1981 [JP] Japan .................. 56-185649
Dec. 28, 1981 [JP] Japan .................. 56-213811
Apr. 1, 1982 [JP] Japan .................. 57-54247

[51] Int. Cl.$^4$ ............................................. B32B 7/00
[52] U.S. Cl. .................................... 428/102; 428/113; 428/260; 428/246; 428/408; 428/902; 428/289
[58] Field of Search ............... 428/113, 102, 902, 246, 428/408, 260, 265, 268, 272, 289, 290; 112/402

[56] References Cited

U.S. PATENT DOCUMENTS

| | | | |
|---|---|---|---|
| 3,819,461 | 6/1974 | Saffadi | 428/902 X |
| 3,939,024 | 2/1976 | Hoggatt | 428/902 X |
| 4,055,697 | 10/1977 | Schmanski | 428/902 X |
| 4,103,055 | 7/1978 | Levy | 428/902 X |
| 4,173,670 | 11/1979 | Van Auken | 428/902 X |
| 4,228,207 | 10/1980 | Porte et al. | 428/902 X |
| 4,237,175 | 12/1980 | Kobayashi | 428/902 X |
| 4,405,669 | 9/1983 | Pott | 428/902 X |
| 4,438,173 | 3/1984 | Trost | 428/902 X |
| 4,484,459 | 11/1984 | Hutson | 428/902 X |
| 4,536,438 | 8/1985 | Bishop et al. | 428/902 X |
| 4,550,045 | 10/1985 | Hutson | 428/902 X |

Primary Examiner—Nancy A. B. Swisher
Attorney, Agent, or Firm—Armstrong, Nikaido, Marmelstein & Kubovcik

[57] ABSTRACT

A fiber material for reinforcing plastics prepared by laminating at least one first fiber substrate in which the reinforcing fibers extend in two directions including the longitudinal direction and the transverse direction intersecting therewith at a substantially right angle with at least one second fiber substrate in which the reinforcing fibers extend in two directions including directions having angles of ±(25-65) degree relative to the longitudinal direction. Or, a fiber material for reinforcing plastics prepared by laminating at least one first fiber substrate in which the reinforcing fibers extend in at least one of two directions including the longitudinal direction and the transverse direction intersecting therewith at a substantially right angle, at least one second fiber substrate in which the reinforcing fibers extend in a direction having an angle of (25-65) degree relative to the longitudinal direction and at least one third fiber substrate in which the reinforcing fibers extend in a direction having an angle of −(25-65) degree relative to the longitudinal direction. The above laminate moldings are integrated with each other by stitch yarns passing repeatedly in the direction of lamination.

17 Claims, 21 Drawing Figures

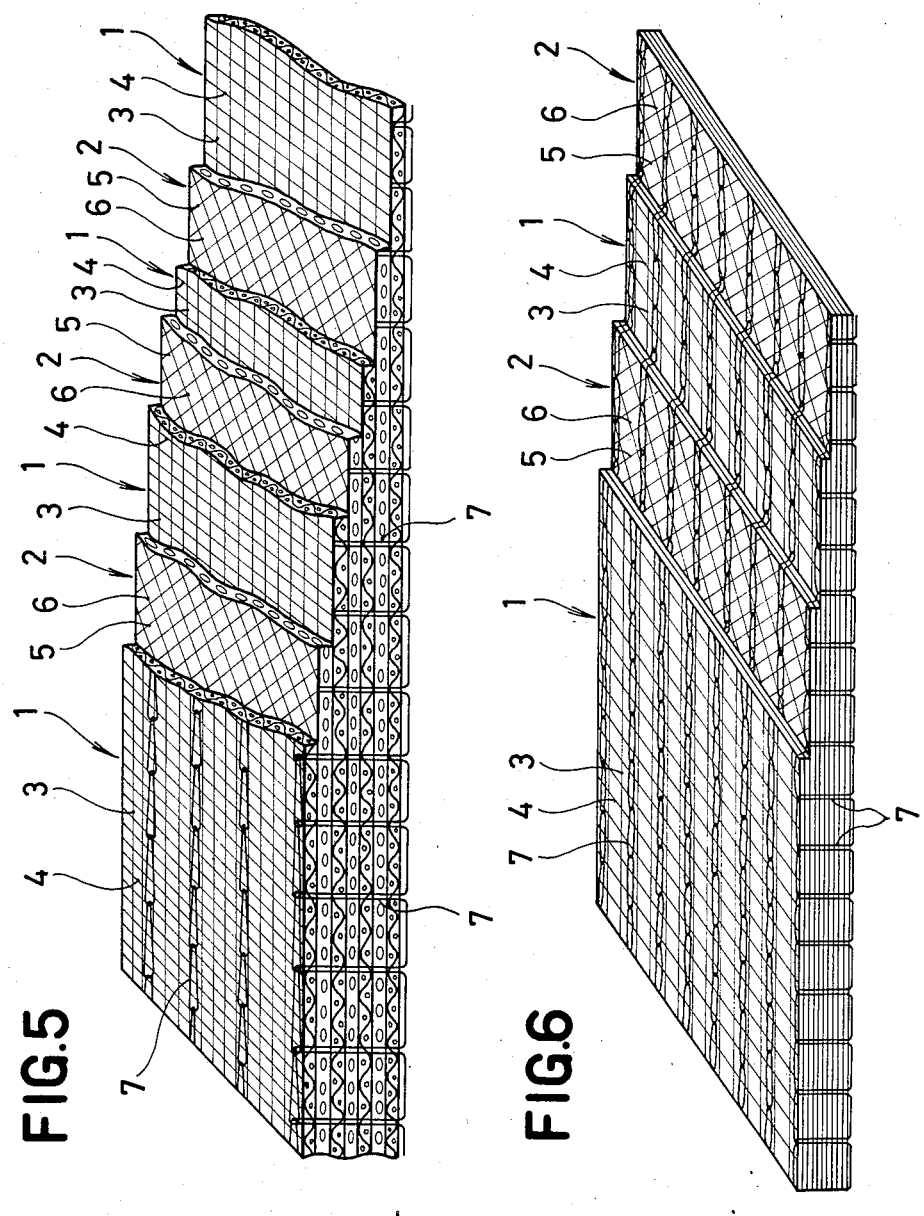

FIG.11 A    FIG.11 B
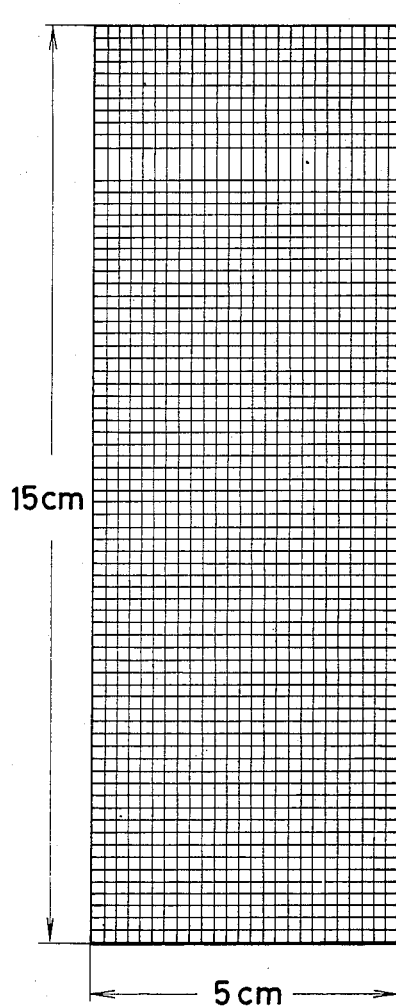
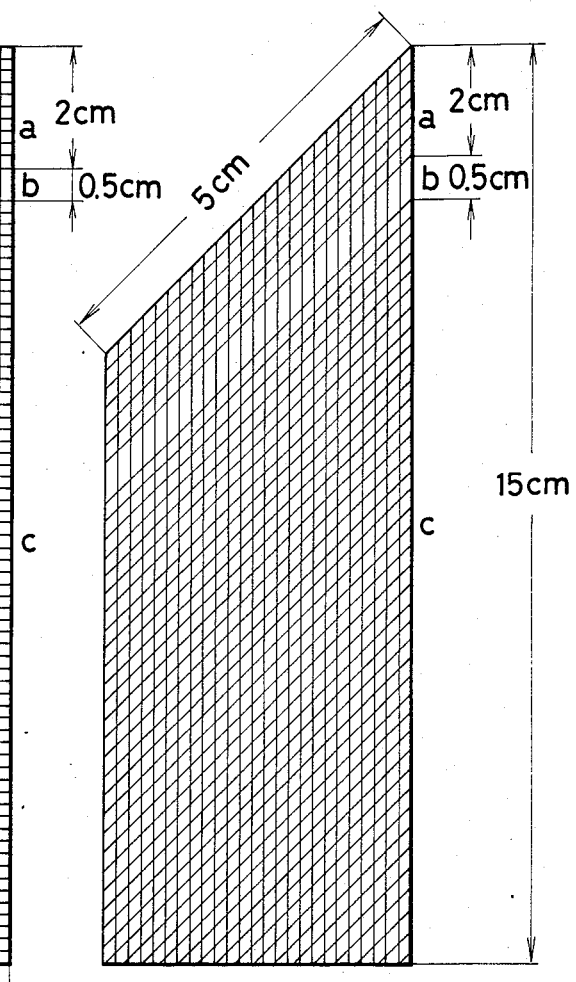

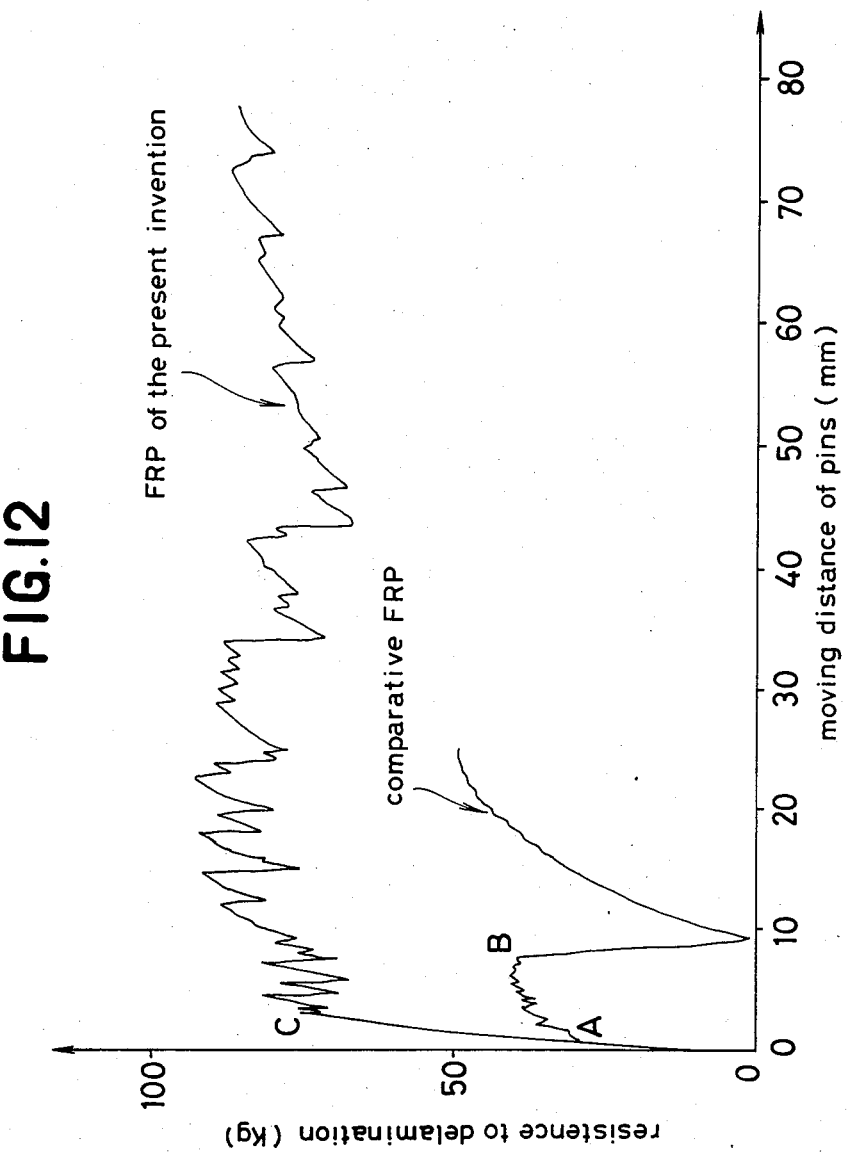

FIBER MATERIAL FOR REINFORCING PLASTICS

This is a continuation of application Ser. No. 410,054, filed Aug. 20, 1982 now abandoned.

BACKGROUND OF THE INVENTION

This invention relates to a reinforcing fiber material used in fiber reinforced plastics (hereinafter referred to as FRP). More particularly, this invention relates to a laminated reinforcing fiber material suitable for use in relatively large FRP.

As regards fiber substrates such as, for example, woven fabric or its prepreg, which are used as reinforcing fiber materials for FRP, not so thick substrates can be obtained. Accordingly, they are usually used in the form of a laminate consisting of a plurality of fiber substrates.

However, when such a laminate is heated under pressure to form FRP, since there is nothing to restrain the fiber substrates from moving relative to each other, the fiber substrates or the reinforcing fibers are pushed aside by a resin flow, and the arrangement of the reinforcing fibers are disturbed. This disturbance in arrangement tends toward increasing, particularly, in case where unidirectional prepregs in which the bond between the reinforcing fibers is performed by resin only is employed or in case where a resin injection molding process consisting of resin intrusion is adopted for a material having a relatively strong texture, such as a woven fabric.

On the other hand, when a quasiisotropic FRP is desired, fiber substrates are laminated so that, for example, directions of their reinforcing fibers cross at an angle of 0, ±45° or 90°. When this is done, since the reinforcing fibers and the resin have markedly different coefficients of linear thermal expansion, residual stresses due to the difference in thermal strain arise between layers. Furthermore, since the Poisson's ratio of FRP is dependent upon the direction of the arrangement of reinforcing fibers and has a great anisotropy within the surface, the difference in Poisson's ratio between layers, when cross-laminated, becomes considerably large. Accordingly, when a stress is given to FRP, stresses due to the above-mentioned thermal strain difference or Poisson's strain difference, in addition to an external force, are exerted in a complicated manner, delamination by resin rupture between layers occurs before the reinforcing fibers are broken. Especially, when high elongation carbon fibers (fibers having an elongation of about 1.7-2.2%) are used as reinforcing fibers, the above-mentioned disadvantages become marked, because there is a great thermal strain difference due to a marked difference between their coefficients of linear thermal expansion (the coefficient of linear thermal expansion of carbon fiber is $-(0.7-1.2)\times 10^{-6}/°C$. and that of resin is about $(55-100)\times 10^{-6}/°C$.), and because there is a greater difference in Poisson's strain due to its high elongation. Furthermore, the more fiber substrates a laminate has, that is, a thicker FRP has more resin layers between fiber substrates, the more marked the above-mentioned problem becomes, causing a decrease in reliability of FRP. Moreover, once a crack arises between layers, it propagates at a stretch because there is nothing to prevent the propagation.

SUMMARY OF THE INVENTION

It is a principal object of this invention to provide a fiber material for reinforcing plastics, prepared by laminating a plurality of fiber substrates and having quasiisotropy within its surface.

It is another object of this invention to provide a high-reliability fiber material for reinforcing plastics, in which delamination does not occur between a plurality of fiber substrates.

It is still another object of this invention to provide a reinforcing fiber material useful for large FRP requiring high strength, particularly, such as beams.

In order to attain the above-mentioned objects, the fiber material for reinforcing plastics according to this invention is composed of at least one first fiber substrate in which the reinforcing fibers extend in two directions including the longitudinal direction and the transverse direction intersecting therewith at a substantially right angle and at least one second fiber substrate in which the reinforcing fibers extend in two directions having angles of ±(25-65) degree relative to the longitudinal direction. And said first fiber substrate and said second fiber substrate are laminated in the same longitudinal direction, and constructed so that they are integrated with each other by stitch yarns passing through repeatedly in the direction of the fiber substrates in the laminated state. And, another embodiment of a fiber material for reinforcing plastics according to this invention is composed of at least one first fiber substrate in which the reinforcing fibers extend in at least one of two directions including the longitudinal direction and a direction intersecting with the longitudinal direction at a substantially right angle, at least one second fiber substrate in which the reinforcing fibers extend in a direction having an angle of (25-65) degree relative to the longitudinal direction and at least one third fiber substrate in which the reinforcing fibers extend in a direction having an angle of −(25-65) degree relative to the longitudinal direction. Said respective first, second and third substrates are laminated in the same longitudinal direction and constructed so that they are integrated with each other by stitch yarns passing repeatedly through the substrates in the direction of the fiber substrates in the laminated state.

Still further objects of this invention will be apparent from the description of examples illustrated with reference to the drawings.

BRIEF DESCRIPTION OF THE DRAWINGS

FIG. 5 is a perspective view illustrating a reinforcing fiber material according to another embodiment, part of which is cut away;

FIG. 6 is a perspective view illustrating a reinforcing fiber material according to still another embodiment;

FIGS. 11A and 11B are plan views each illustrating a test piece for measuring the resistance of yarn slippage of a woven fabric; and FIG. 12 is a graph illustrating a comparison of resistance to delamination of FRP molded from a reinforcing fiber material according to this invention and FRP outside this invention.

DETAILED DESCRIPTION OF THE PREFERRED EMBODIMENTS

Figure 1:
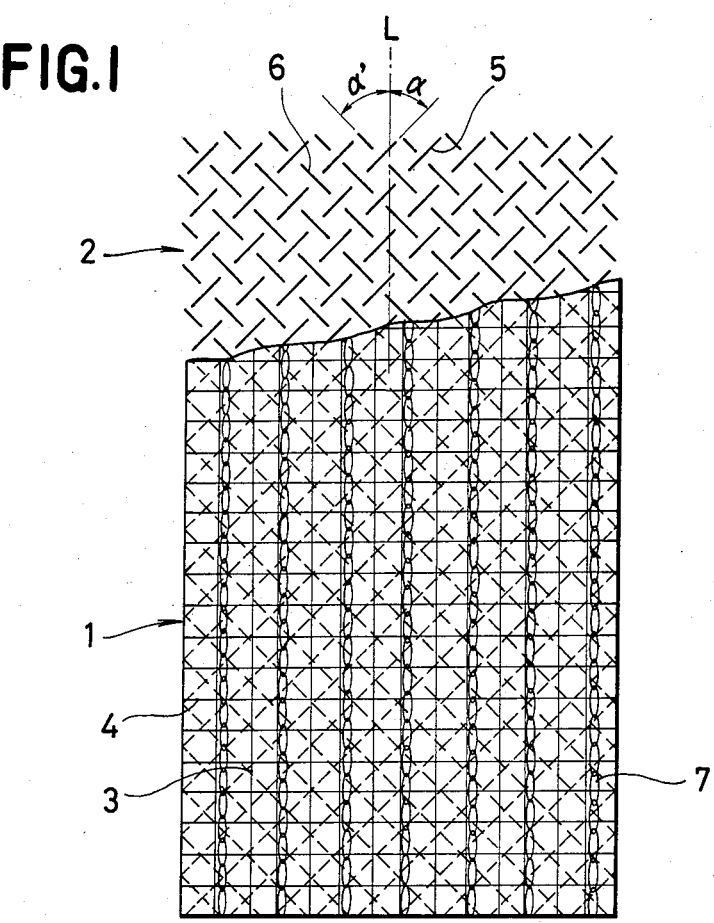
FIG. 1 is a plan view illustrating a reinforcing fiber material according to an embodiment of this invention, part of the top layer of which is cut away.
Figure 2:
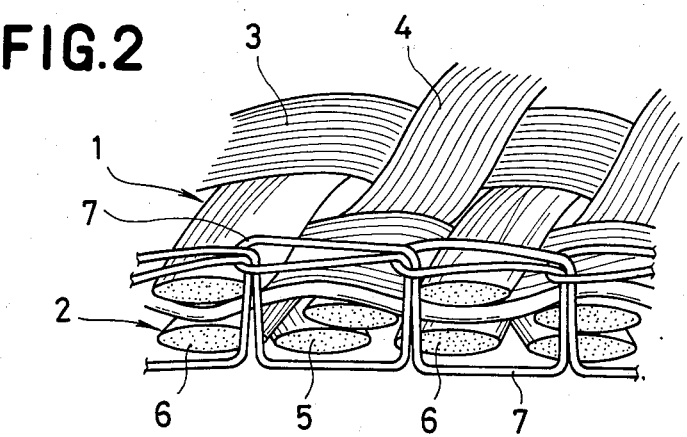
FIG. 2 is a perspective view illustrating the same material, wherein its side is taken as the cross-section.

In FIGS. 1 and 2, the reinforcing fiber material is composed of a first fiber substrate 1 on the top consisting of a woven fabric and a second fiber substrate 2 on the back consisting of fabric. Of these substrates, the first fiber substrate on the top is composed of plain weave of longitudinal reinforcing fibers 3 and transverse reinforcing fibers 4 intersecting therewith, and the second fiber substrate 2 on the back is composed of plain weave of reinforcing fibers 5 and 6 intersecting with each other in bias directions each having an angle of $\alpha$ or $\alpha'$ relative to the longitudinal direction L of the fabric. The angles $\alpha$ and $\alpha'$ of the reinforcing fibers 5 and 6 of the second fiber substrate 2 can be varied within the ranges: 25 to 65 degree and $-25$ to $-65$ degree, respectively, but it is generally preferred that $\alpha = 45$ degree and $\alpha' = -45$ degree.

Figure 3:
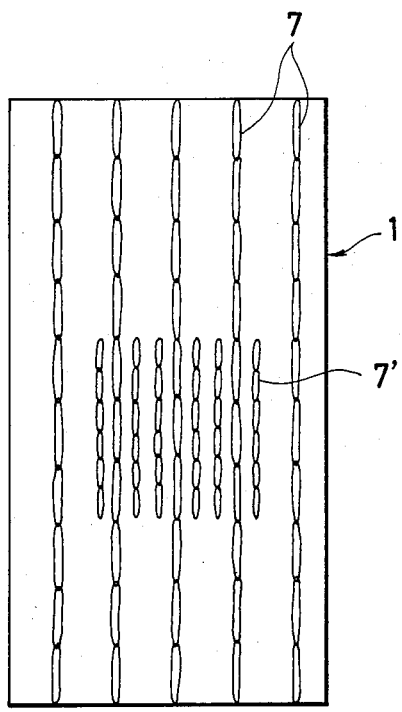
FIGS. 3 and 4 are each a plan view illustrating an embodiment showing a manner of application of stitch yarns.
Figure 4:
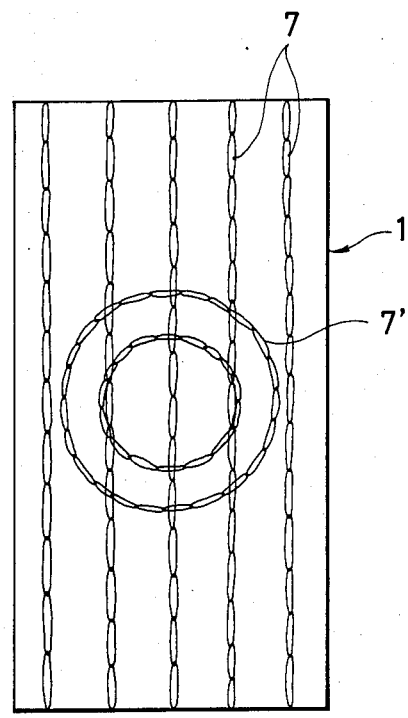

With the two fiber substrates 1 and 2 laminated as above are engaged stitch yarns 7 at an equal pitch along the longitudinal direction of the fiber substrate. While the yarns are passing repeatedly from the top to the back and then from the back to the top of the two fiber substrates, the yarns integrate the fiber substrates 1 and 2 on both sides. A plurality of stitch yarns 7 are provided at intervals substantially equidistant in the lateral direction so that the fiber substrates 1 and 2 are integrated over the entire surface. The positions of the stitch yarns 7 relative to the reinforcing fibers 3 and 4, and 5 and 6 of the fiber substrates 1 and 2 are not necessarily regular but can be random. Furthermore, as shown in FIG. 3 and FIG. 4, it is also possible to apply additional stitch yarns 7' particularly to areas for which further reinforcement of integration is necessary.

The reinforcing fiber material of the above structure can give quasiisotropic physical properties to FRP in the direction within its surface, because the first fiber substrate 1 has reinforcing fibers 3 and 4 in the longitudinal direction and in the transverse direction intersecting it at a right angle and the second fiber substrate 2 has reinforcing fibers 5 and 6 in bias directions relative to the above directions.

An example shown in FIG. 5 is a reinforcing fiber material wherein the number of laminations of the above-mentioned first and second fiber substrates 1 and 2 are increased. In this fiber material, a first fiber substrate 1 having longitudinal and transverse reinforcing fibers 3 and 4 are a second fiber substrate 2 having reinforcing fibers 5 and 6 in the bias directions are laminated alternately one by one to form seven layers and these layers are integrated by stitch yarns 7 passing upwardly and downwardly through the layers.

Also in this case, quasiisotropy can be obtained by lamination of the first fiber substrate 1 and the second fiber substrate 2 and besides a still thicker reinforcing fiber material can be obtained. In this case, the first fiber substrate 1 and the second fiber substrate 2 can be laminated alternately one by one as in the embodiment, but the first and second fiber substrates can be laminated alternately so as to form groups consisting of one to several substrates. Further, as shown in FIG. 6, a structure can be possible in which the laminated substrates 1 and 2 are slided in its longitudinal direction so that the laminate has a varied thickness.

Figure 7:
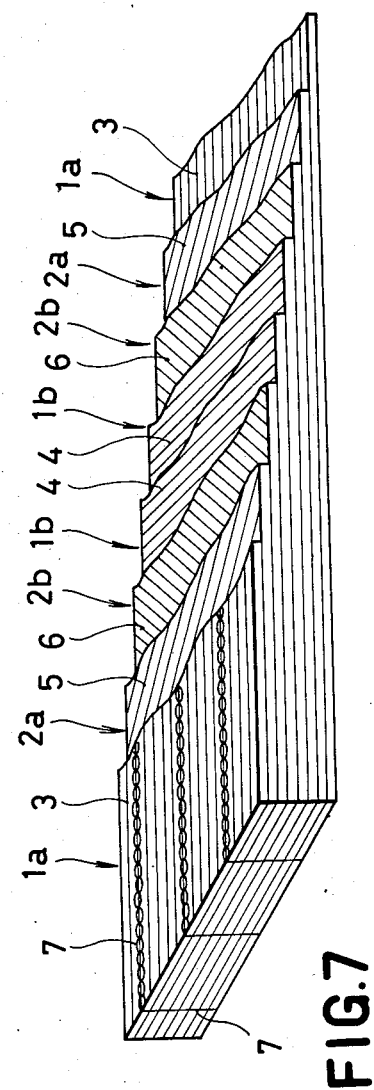
FIG. 7 is a perspective view illustrating a reinforcing fiber material according to still another embodiment, part of which is cut away.

Furthermore, it is not necessarily required that the first fiber substrate 1 and/or the second fiber substrate 2, by themselves, have simultaneously reinforcing fibers 3, 4, 5 and 6 crossing in two directions. That is, when these fiber substrates 1 and 2 have only one group of reinforcing fibers 3 or 4, and 5 or 6, they are satisfactory if they in the state of a laminate of a plurality of layers are quasiisotropy as a whole. FIG. 7 shows an embodiment for such case.

The reinforcing fiber material shown in FIG. 7 is constructed by laminating a plurality of the first fiber substrates 1a and 1b, the second fiber substrate 2a and the third fiber substrate 2b and integrating these substrates by stitch yarns 7. The first fiber substrate 1a is a unidirectional prepreg prepared by gathering by impregnating longitudinally arranged reinforcing fibers 3 with an uncured thermosetting resin, the first fiber substrate 1b is a unidirectional prepreg prepared by gathering by impregnating transversely arranged reinforcing fibers 4 with an uncured thermosetting resin, the second fiber substrate 2a is a unidirectional prepreg prepared by gathering by impregnating reinforcing fibers 5 in the bias direction with an uncured thermosetting resin, and the third fiber substrate 2b is a unidirectional prepreg prepared by gathering by impregnating reinforcing fibers 6 in the bias direction with an uncured thermosetting resin. The bias angle with respect to the longitudinal direction of the second fiber substrate 2a is $+(25-65)$ degree, and the bias angle with respect to the longitudinal direction of the third fiber substrate 2b is $-(25-65)$ degree. In this way, the reinforcing fiber material formed by laminating the fiber substrates has, as a whole, reinforcing fibers 3, 4, 5 and 6 in respective directions and possesses quasiisotropy within the surface.

For the individual fiber substrate, a unidirectional woven fabric can be used instead of the above-mentioned prepregs consisting only of reinforcing fibers. That is, it is possible to use a so-called unidirectional woven fabric in which the reinforcing fibers are used only in one direction as warp or weft and these reinforcing fibers are supported by auxiliary fibers as weft or warp. Of course, a woven fabric prepreg impregnated with a resin can also be used.

Figure 8:
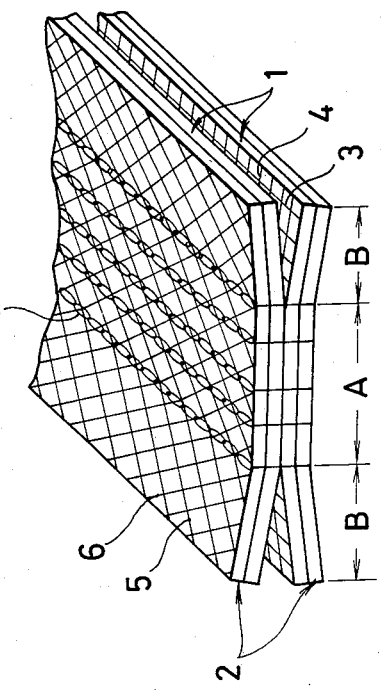
FIG. 8 is a perspective view illustrating a reinforcing fiber material according to still another embodiment.

In the reinforcing fiber material shown in FIG. 8, a pair of first fiber substrates 1 having the above-mentioned reinforcing fibers 3 and 4 is arranged inside, a pair of second fiber substrates 2 having the reinforcing fibers 5 and 6 is arranged outside and these substrates are integrated by stitch yarns 7. Here, binding by the stitch yarns 7 is performed so that the four layers are integrated only in the central region and in both side regions B, B, the four layers are separated at an intermediate layer. However, two adjacent first and second fiber materials 1 and 2 may be integrated in both side regions B, B. This structure is advantageous for molding FRP beams hereinafter described.

The reinforcing fiber material shown in each of the above-mentioned embodiments can be in the form of a prepreg prepared by preimpregnation with an uncured resin or in the state not impregnated with a resin. In the latter case, at the time of molding into FRP a resin is intruded into a metal mold while the fiber material is charged in the mold.

In the above-mentioned embodiments, in case where the fiber substrates 1 and 2 consist of woven fabrics, the woven fabrics have a plain weave. However, other weaves such as satin weave and twill weave can also be used. Furthermore, the so-called noncrimp fibrous structure prepared by integrating, by auxiliary fibers, two yarn groups prepared by gathering bend-free straight reinforcing fibers in parallel to one another in the form resembling a sheet, as disclosed in U.S. Pat. No. 4,320,160 is preferred because the reinforcing fibers do not have bends on which a stress is concentrated, its characteristic property can be fully exhibited and the mechanical strength and breaking strength of FRP can become still higher. Furthermore, satin weave is preferred because it is possible to obtain a thicker woven fabric substrate (per sheet) as compared with other weaves, the resistance of yarn slippage is relatively small and, during needling stitch yarns by a needle, the reinforcing fibers of the fiber substrates are hardly damaged. Furthermore, with respect to the second fiber substrate 2 in which the reinforcing fibers are bias, the weave slide arising when a tension is applied in the prepreg step or the molding step can be prevented by previous passing of stitch yarns along the longitudinal direction. Accordingly, it is suitable to produce fiber reinforced plastics having uniform physical properties.

As the reinforcing fibers which are used in this invention, there are preferably used multifilament yarns such as carbon fiber, glass fiber, polyaramide fiber, silicon carbide fiber or metal fiber. Of these, carbon fiber is the most suitable. This carbon fiber includes, needless to say, a so-called graphite fiber having a graphitize structure.

Moreover, when the reinforcing fibers are made into a woven fabric, the reinforcing fibers include glass fiber, polyaramide fiber, silicon carbide fiber, alone or in combination of at least two types. It is most suitable that the twist number to be given to reinforcing fibers used as multifilament yarns is substantially zero and at most 20 T/m. When the twist number becomes too large, the resin impregnation during the production of FRP becomes poor and it is difficult to heighten the volume content of the fiber as a composite material. Furthermore, when reinforcing fibers for stitching are passed through by a needle, the reinforcing fibers are readily broken by the needle. This tendency becomes marked particularly in case of carbon fiber which has an extremely high modulus of elasticity and a low elongation at break and is brittle to bend.

It is preferred that the carbon fiber which is used in this invention has an elongation at break of 1 to 2.2%, and particularly, 1.7 to 2.2% as measured by a method specified in JIS C 7601. Moreover, it is preferred that the monofilament diameter is 4 to 12$\mu$. It is also preferred that the carbon fiber used as reinforcing fibers has a cross-sectional area of 0.07 to 3.5 mm$^2$. If the cross-sectional area of reinforcing fibers is smaller than 0.07 mm$^2$, only a thin fiber substrate can be obtained. Accordingly, to obtain fiber material having a considerable thickness, lamination of more fiber substrates is necessary and if this is done, the FRP is to have more interlayer parts, that is, weak points. Moreover, such lamination is not preferred from the viewpoint of production because the number of lamination steps increases. On the contrary, when the cross-sectional area is larger than 3.5 mm$^2$, it becomes difficult to infiltrate the resin uniformly into the interior because of excessive thickness. Furthermore, when the substrates are woven fabrics, bend by crossing among the reinforcing fibers becomes excessively large, concentrating a stress on this bend portion, and accordingly it becomes impossible to fully utilize the characteristic properties of the reinforcing fibers.

It is preferred that the stitch yarns 7 have an elongation at break larger than those of the reinforcing fibers 3, 4, 5 and 6. That is, as mentioned below, because the stitch yarns have large bend at upper and lower surfaces of the fiber materials, an extreme stress concentration occurs to the stitch yarns when a stress is given to FRP. Accordingly, it becomes possible to prevent break at the stitch yarns by selecting an elongation at break of the yarns larger than those of the reinforcing fibers.

The stitch yarns are preferably selected from the group consisting of multifilament yarns of carbon fiber, glass fiber, polyaramide fiber, silicon carbide fiber and metal fiber. If the reinforcing fibers are carbon fibers, the stitch yarns are preferably selected from the group consisting of glass fiber and polyaramide fiber. The monofilament diameter of glass fiber used as stitch yarns is preferably 3 to 7$\mu$ and that of polyaramide fiber is preferably 5 to 20$\mu$.

To prevent delamination by stitch yarns effectively, it is preferred to pass the stitch yarns through a plurality of laminated substrates at an angle substantially perpendicular to the surface of the fiber substrates. Also in case where the stitch yarns are biased relative to the perpendicular of the surface of the fiber substrate, it is preferred that the bias angle is in the range: $-15$ to $15$ degree, and preferably, $-5$ to $5$ degree with respect to its perpendicular. Generally, FRP has characteristics that it exhibits a high strength along its fiber axis direction but the strength decreases sharply as the angle to the fiber axis direction becomes larger. That is, it is preferred for the effective prevention of delamination that the stitch yarns are passed through in the state where the yarns exhibit their highest strength. When the stitch yarns are passed through an angle outside the above critical angle, more stitch yarns are required to prevent the delamination. This is not preferable because the possibility of the fiber substrate to be damaged by a needle is increased.

It is preferred that these stitch yarns have characteristics that the yarns have a thermal shrinkage at 120° C. of not higher than 2%, preferably, a thermal shrinkage at 180° C. of not higher than 1%. This is because, as mentioned above, the function of stitch yarns consists in prevention of delamination of fiber substrates and when heat is applied, for example, during the drying step of prepreg production, a stress is given by an extreme thermal shrinkage of the stitch yarns and a break at the stitch portion becomes apt to occur.

With respect to the thickness of the stitch yarns, it is preferred that the cross-sectional area is 0.01 to 0.25 mm$^2$. When the thickness is too large, the stitch yarns protrude beyond both surfaces of the laminated fiber substrates and when molded into FRP, it is impossible to heighten the volume fraction of the reinforcing fiber. On the contrary, when the thickness is too small, more stitch yarns are required to prevent the delamination and accordingly the number of needle passages is increased and the possibility of the fiber damage is increased particularly in case where carbon fibers are used as reinforcing fibers.

It is preferred that the stitch yarns are composed of multifilament yarns and that in this case the reinforcing fibers have the lowest possible twist number, preferably, a twist number of 30 to 70 T/m in order to heighten the volume fraction of the reinforcing fibers in the production of FRP. Moreover, with respect to seaming with stitch yarns, single chain stitching in which only one yarn entangles with itself to form loops or lock stitching in which two yarns, i.e., upper yarn and lower yarn, entangle with each other can be used. Preferably, single chain stitching is used.

It is preferred that both the stitch length of stitch yarns and the interval between adjacent stitch yarns are 2 to 30 mm. When the stitch length and the stitch interval are smaller than 2 mm, the number of stitches, i.e., the number of needle passages necessary to pass the stitch yarns, increases and the possibility of the reinforcing fibers to be damaged increases unfavorably. When they exceed 30 mm, the stitch density becomes too large to obtain a sufficient stitch effect.

With respect to the passing length of stitch yarns, it is preferred to be 0.9 to 1.1 times the thickness of an FRP molding and more suitably substantially equal to it. When the passing length of stitch yarns is smaller than 0.9 time the thickness of an FRP molding, the fiber substrates are fastened too strongly and infiltration of resin into the substrates, the reinforcing fibers and the monofilaments becomes difficult. Furthermore, when a molding is performed by a mold, a spindle-shaped clearance is formed between the stitch portion and the inner surface of the mold, and this clearance is filled with resin. On the other hand, when the passing length is longer than 1.1 times, an excessive yarn length corresponding to passing length of stitch yarn minus thickness of FRP molding becomes too long, and the stitch yarns are bent in the direction of the thickness of the fiber material and the stitch effect becomes difficult to obtain.

With respect to the resin for the impregnation of reinforcing fiber material, it is preferably a resin selected from the group consisting of an unsaturated polyester resin, an epoxy resin, a phenol resin and a polyimide resin, for both impregnation to prepare prepregs and intrusion of resin during molding into metal mold.

In case where fiber substrates are composed mainly of woven fabrics, the resin content based on the reinforcing fiber material is preferably 35 to 60% by volume. When the resin content is lower than 35 % by volume in the molding of FRP, the amount of resin is not sufficient to fill the geometrical space confined by the fiber substrates and the reinforcing fibers, voids increase, bondability between the fiber substrates and the reinforcing fibers decrease and the FRP properties, particularly tensile strength and shear strength, deteriorate. On the contrary, when the resin content is higher than 60 % by volume, the content of reinforcing fibers becomes too low. Since characteristic properties of FRP, such as strength and elastic modulus, vary in approximate proportion to the content of the reinforcing fibers, with a resin content exceeding 60 % by volume, the above characteristic properties deteriorate because of extremely low content of the reinforcing fibers. A preferable content of resin is 40 to 55 % by volume.

Furthermore, the resin content in case where the fiber substrates are unidirectional prepregs is preferably 30 to 60% by volume for the same reason as above. Preferably, the content is 35 to 50 % by volume. Here, the reason why the lower limit of the resin content is somewhat lower than the above case is that the geometrical space confined by the fiber substrates and the reinforcing fibers is somewhat smaller in the case of unidirectional prepregs. A problem in case where the reinforcing fibers consist of carbon fiber is that it is weak to bend and brittle. Owing to these characteristic properties partial break of carbon fibers is apt to occur when the stitch yarns are passed by a needle. The partial break of carbon fibers, when the fibers are made into a composite material, inevitably results in a decrease in strength of the resulting FRP. In order to make stitching by stitch yarns possible by eliminating the partial break of carbon fibers, it is preferred that the fiber substrate composed of carbon fibers has a resistance to yarn slippage of a woven fabric of 40 to 600 g/cm, preferably 100 to 500 g/cm. If it exceeds 600 g/cm, the partial break of carbon fibers by a needle becomes marked, while if it is lower than 40 g/cm, the fiber yarns are apt to zigzag during the formation of the woven fabric and the form of the woven fabric becomes unstable.

Here, the weave slide resistance of a woven fabric means a resistance measured according to JIS L 1079-1966 method. That is, as shown in FIG. 11A, three test pieces (5 cm along warp and 15 cm along weft) are cut from a fiber substrate. A transverse yarn situated at a 0.5 cm interval (b) contiguous to a 2.0 cm interval (a) is removed, a comb-shaped pin specified in JIS is inserted into the portion (b), the test piece is set on a tensile testing machine, the portion (c) is pulled at a constant rate of 10 cm/min, the maximum pulling resistance of the yarn at the portion (a) is measured. The data are expressed by an average of three measurements (rounded to an integer). Also, in case where the crossing reinforcing fibers are not in an angular relation of 90 degree, test pieces cut along warp and weft as shown in FIG. 11B are prepared, and the test pieces are measured according to the above-mentioned method.

When the above-mentioned weave slide resistance of a woven fabric is satisfied, it becomes possible even in case of a fiber substrate using carbon fiber which is fragile to bend as reinforcing fibers to stitch up by stitch yarns without partial break of the carbon fibers.

With respect to a needle for stitch yarn application, one having the least possible cross-sectional area, a sharp point and a smooth surface is preferred. The use of a needle having a surface provided with zigzag barbs, a so-called felt needle should be avoided because such a needle causes partial break of carbon fibers.

The reinforcing fiber material according to this invention is placed in a metal mold after it has been converted into a prepreg by impregnation with an uncured resin or it is placed in a metal mold and impregnated with a resin. Then, by heat curing, an excellent thick FRP having quasiisotropic properties and being free from delamination can be obtained.

The reinforcing fiber materials of this invention are particularly useful for FRP plates which must have quasiisotropy toward the interior of the sheet and can be substituted for duralumin, which is a conventional light metal alloy. For example, the materials are useful for skin materials of an airplane wing or H- or I-beams.

Figure 9:
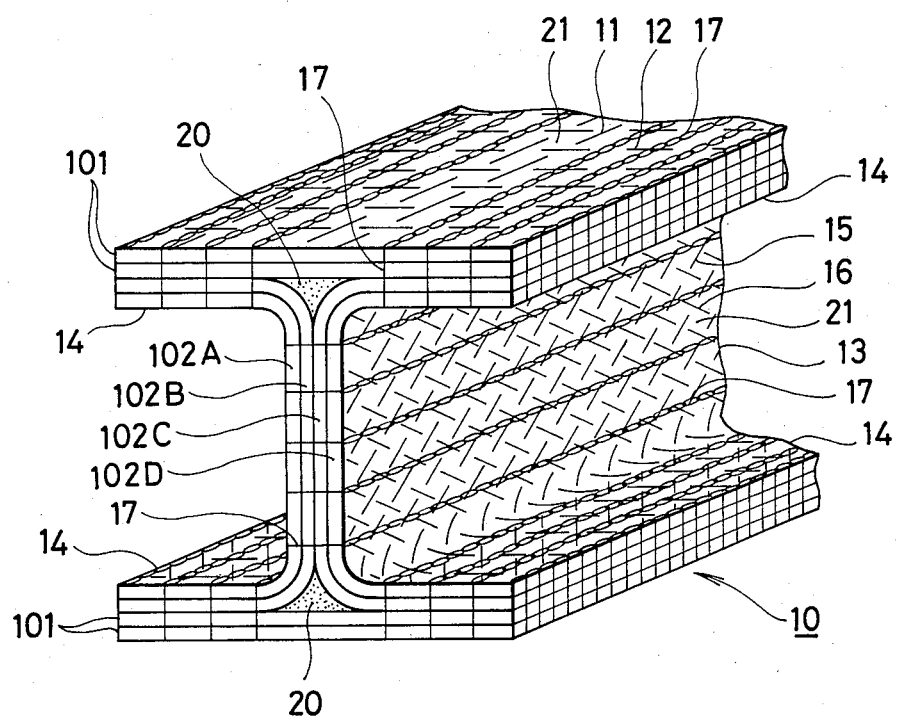
FIG. 9 is a perspective view illustrating a reinforcing fiber material of this invention formed for a I-beam.
Figure 10:
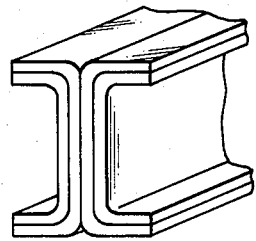
FIGS. 10A through 10I are each a perspective view illustrating an embodiment of a beam molded from a reinforcing fiber material according to this invention.
Figure 10:
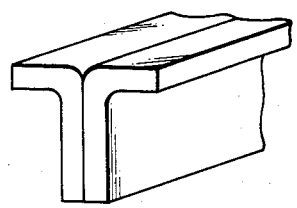
Figure 10:
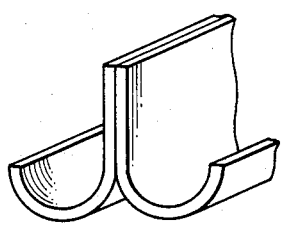
Figure 10:
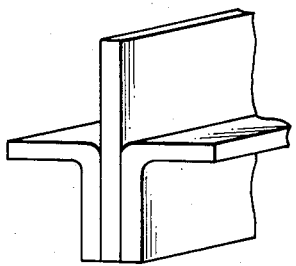
Figure 10:
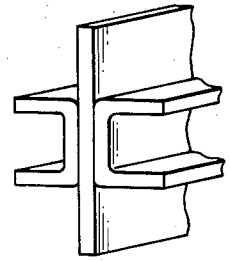
Figure 10:
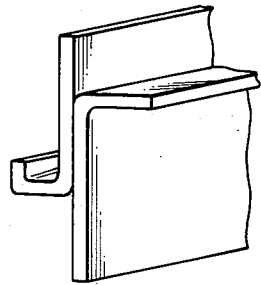
Figure 10:
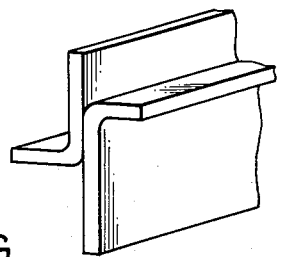
Figure 10:
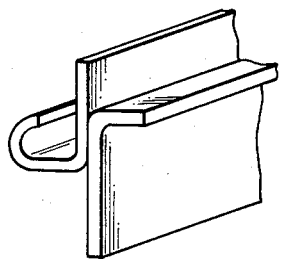
Figure 10:
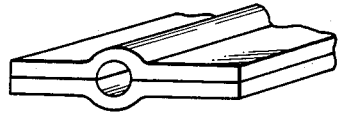

FIG. 9 illustrates an FRP I-beam molded on the basis of the technical idea of the reinforcing fiber materials according to this invention. In FIG. 9, an FRP I-beam 10 has a reinforcing fiber material shaped into a beam having an I cross-section and having a web 13 and flanges 14. To construct a reinforcing fiber material, it has four sheets of plain weave fabrics 102A, 102B, 102C and 102D of carbon fibers, corresponding to the above-described second fiber substrates. These four fabrics 102A, 102B, 102C and 102D are laminated at the portion of the web 13 so that warps 15 and wefts 16 are situated at angles of 45 degree and −45 degree, respectively, relative to the longitudinal direction of the beam 10, and integrated by stitching by stitch yarns 17 composed of glass fiber multifilament yarns. On the other hand, said fabrics 102A, 102B, 102C and 102D are diverged in the flange portions 14 in the opposite directions to form separate sets of the plain weave fabric 102A and 102B, and 102C and 102D. On each of the diverged surface are laminated two sheets of plain weave fabrics 101 of carbon fiber, corresponding to the above-described first fiber substrates so that their warps 11 and wefts 12 have angles of 0 and 90 degrees, respectively, relative to the longitudinal direction of the beam 10, and are integrated with said plain weave fabrics 102A and 102B, and 102C and 102D by stitch yarns 17 composed of glass fiber multifilaments and extending in the longitudinal direction of the beam 10. Each of the spaces confined by the plain weave fabrics 102A and 102B, and 102C and 102D, and the plain weave 101 is filled with an adjusting material consisting of carbon fibers in a direction selected so that its longitudinal direction coincides with the longitudinal direction of the beam 10.

A resin 21 is infiltrated into the reinforcing fiber material thus constructed and heat-cured. Of course, in addition to plain weave, the above-mentioned fabrics of satin weave, twill weave or noncrimp fibrous structure can be used as the fiber substrates.

Preferably, the number of lamination of fiber substrates is at least 2. By properly selecting this number and portions to be stitched or diverged, beams having a variety of shapes, as shown in FIGS. 10A through 10I, can be obtained in addition to the I-beam shown in this embodiment. Furthermore, different types of sheet-like substrates can be laminated, for example, in an alternating manner. Further, when the substrates consist of woven fabrics, they can be laminated so that the directions of the warp and weft of the fabric differ, for example, in the beam of the embodiment, the yarn direction on the outermost layer is 0 degree relative to the longitudinal direction and the yarn direction on the two inner layers is 45 degree. A layer in which the warp and weft directions are ±45 degree relative to the longitudinal direction of the beam can react effectively with a shearing stress produced when a longitudinal bending stress is given to the beam.

The fiber substrates need be stitched at the web portion of the beam, but not at the flange portions. Furthermore, it is also possible to form a flange by diverging the substrates to form sets of plain weave fabric 102A and 102B, and 102C and 102D without laminating at the flange portion, stitching or not stitching each set of the plain weave fabrics. However, the lamination of a plain weave fabric 101, i.e., fiber substrate, on the diverged surface as in FIG. 9 is preferred because it is possible to give the same thickness to the web and the flanges.

The above-described beam has high mechanical strength, particularly, interlayer shear strength and delamination strength, because there are stitch yarns also in the direction of lamination of a plurality of substrates. Moreover, the beam has an increased breaking strength because, when a crack forms on the lamination surface, the propagation of this crack is prevented by the stitch yarns in the direction of lamination.

As has been described, the reinforcing fiber materials of this invention can be given quasiisotropic properties by laminating a plurality of fiber substrates having different directions of reinforcing fibers, and can give delamination-free, high-reliability materials for reinforcing plastics by integrating the laminate of the substrates with stitch yarns passing through in the direction of lamination.

EXAMPLE 1

A plain weave fabric, warp and weft densities 5 ends/cm and 5 pitches/cm, respectively, in which the reinforcing fibers extended in two directions including the longitudinal direction and a direction intersecting therewith at a right angle (hereinafter referred to as woven fabric A) was obtained by using, as the reinforcing fibers, carbon fibers "TORAYCA" T-300 (a product of Toray Industries, Inc., average monofilament diameter of $7\mu$, filament number of 3,000, cross-sectional area of 0.11 mm$^2$, twist number of 15 T/m, strand strength of 330 kg/mm$^2$, strand modulus of $23.5 \times 10^3$ kg/mm$^2$, elongation at break of 1.4%).

On the other hand, a bias woven fabric in which the reinforcing fibers extended in two directions having angles of ±45 degree relative to the longitudinal direction (hereinafter referred to as woven fabric B) was obtained by using the above "TORAYCA" T-300, making a double weave fabric of plain weave having warp and weft densities of 5 ends/cm and 5 pitches/cm, respectively, and cutting and opening this hollow or circular weave fabric helically at an angle of 45 degree relative to the longitudinal direction.

Then, said woven fabrics A and B were laminated alternately one by one in the same longitudinal direction to form a 10-layer laminate and secured temporarily at its edge with a tape to obtain a quasiisotropic laminate (hereinafter referred to as comparative laminate).

On the other hand, a quasiisotropic laminate was obtained from the comparative laminate using, as stitch yarns, yarns prepared by giving a twist of 40 T/m to polyaramide fiber "KEVLAR⇌- 49 (average monofilament diameter of $12\mu$, 1420 denier, cross-sectional area of 0.11 mm$^2$, elongation at break of 2.4%; a product of E.I. du Pont Co., Ltd.) by single thread chain stitching along the warp direction of the woven fabric A by needling under conditions including a stitch length of 10 mm and stitch interval of 10 mm. (This laminate was hereinafter referred to as laminate of this invention).

Then, the above comparative laminate was cut along the warp and weft directions of the woven fabric A to form a plate (35 cm × 35 cm). This plate-form composite laminate was set within a metal mold (inside size 35 cm × 35 cm) whose periphery was sealed with silicone rubber, the metal mold was preheated to about 80° C., while it was evacuated by a vacuum pump, and an epoxy resin having a viscosity lowered to about 2 poise by heating to 80° C. was intruded into the mold at a pressure of 3 kg/cm$^2$ to infiltrate the resin into the comparative laminate. Thereafter, the temperature was raised to 180° C. and the resin was cured by holding it in this state for about 2 hours to obtain an FRP plate having a thickness of 2.2 mm and a reinforcing fiber of 47.1 % by volume fraction (hereinafter referred to as comparative FRP). The above epoxy resin consisted of a mixture of 100 parts by weight of "EPIKOTE" 827, an epoxy resin made by Petrochemicals Co., 90 parts by weight of Methyl Nadic Anhydride (NMA) made by the same company and 1 part by weight of 2-ethyl-4-methylimidazole (EMI) made by Shikoku Kasei Co., Ltd. Further, an FRP plate using the laminate of this invention and having a thickness of 2.2 mm, a reinforcing fiber of 46.5% by volume fraction and a stitch yarn of 1.4% by volume fraction (hereinafter referred to as FRP of this invention) was obtained in quite the same manner as above.

Then, the above comparative FRP was cut in a direction in which the longitudinal direction coincided with the warp direction of the woven fabric A to form a test piece having a length of 210 mm and a width of 20 mm. This test piece was subjected to a tensile test by using a tensile testing machine, IS-5000, made by SHIMADZU CORP. under conditions including a tension rate of 5 mm/min to measure a tensile break load and a tensile modulus of elasticity. The tensile break load was 1850 kg and the tensile modulus of elasticity was 4,750 kg/mm$^2$. On the other hand, with respect to the FRP of this invention, a quite similar test piece was made and subjected to a similar test. The tensile break load was 2,085 kg and the tensile modulus of elasticity was 4,700 kg/mm$^2$.

Thus, contrary to the anticipation that, since in the FRP of this invention, the stitch yarns are bent greatly because of single chain stitching and form loops on one surface of the plate, a stress is concentrated on the bent portion and a break develops from the portion in the early stage and that owing to damage to the reinforcing fibers by a needle during passing of stitches, the tensile strength becomes low, the tensile break load of the FRP of the present invention was higher by 235 kg (about 13%) though its reinforcing fiber content was lower than that of the comparative FRP, and besides its tensile modulus was somewhat lower but differs little. Accordingly, it was recognized that the integrating effect of stitch yarns was excellent.

EXAMPLE 2

In quite the same manner as in EXAMPLE 1 except that the total number of laminations of woven fabrics A and B was 26, there were obtained a 6.1-mm thick FRP using the comparative laminate (reinforcing fiber fraction of about 48.8% by volume, hereinafter referred to as comparative FRP) and an FRP plate using the laminate of this invention and having the same thickness (reinforcing fiber fraction of about 48.9% by volume, stitch yarn fraction of about 0.6% by volume, hereinafter referred to as FRP of this invention). These plates were cut so that the longitudinal direction coincided with the warp direction of the woven fabric A to form test pieces having a length of 152 mm and a width of 102 mm.

Then, each of the above test pieces was subjected to a test for longitudinal compression by using a universal testing machine (capacity 30 ton) made by SHIMADZU CORP. The compressive strength of the comparative FRP was 44 kg/mm$^2$, whereas that of the FRP of this invention was 49 kg/mm$^2$ and was higher by about 10%. This can be attributed to the fact that, in the FRP of this invention, the stitch yarns restrain a thermal strain due to the difference in coefficient of linear thermal expansion between the reinforcing fibers and the resin, a Poisson's strain difference resulting from the fact that the respective layers have different Poisson's ratios and a deformation of the plate in the direction of the thickness resulting from compression.

Furthermore, in order to check an influence of an impact upon compressive strength, a falling weight impact having an energy of 275 kg.cm was applied to the center of each of the above test pieces in the direction vertical to the surface and the test pieces were subjected similarly to the test. As a result, the compressive strength of the comparative FRP was 22 kg/mm$^2$, which was lower than that before the impact by 50%, whereas that of the FRP of this invention was 30 kg/mm$^2$ and the drop was as low as about 30%. This can be attributed to the fact that, in the FRP of this invention, the stitch yarns prevented propagation of the cracks produced by the impact.

EXAMPLE 3

In quite the same manner as in EXAMPLE 1, there were obtained a comparative FRP using the comparative laminate and an FRP of this invention using the laminate of this invention. In each test piece, a polytetrafluoroethylene (PTFE) film, length 35 cm, width 5 cm, thickness 100$\mu$, having no adhesion to the resin was inserted, before molding, into an edge portion between the fifth fabric and the sixth fabric to give factitious initial delamination to the edge of the plate. With respect to the FRP of this invention, stitch yarns had been removed from the part into which the film was inserted. That is, integration by stitch yarns was applied to the 35×30 cm part only.

Next, each FRP was cut so that the film-inserted portion was situated at the vertex of an isosceles triangle having a base length of 104 mm and an oblique line of 300 mm. Then, test pieces were prepared by bonding aluminum plates having the same shape and a thickness of 10 mm to both surfaces of the test pieces with an epoxy type adhesive. A pin was inserted into each of the aluminum plate of the vertex of each test piece.

Next, the relationship between the resistance to delamination and the moving distance of pin was determined by pulling the pin of each test piece in the vertical direction of the surface of the plate at a speed of 2.5 mm/min by use of the above-mentioned tensile testing machine. The results of this measurement are shown in FIG. 12. As can be seen from FIG. 12, in the comparative FRP, new delamination continuous to the initial delamination was developed between the fifth and sixth layer fabrics at a relative low resistance as low as 30 kg (point A). This delamination was suppressed by the bonding strength of the resin for some time, but propagated at point B at a stretch and the resistance became almost zero.

On the contrary, in the FRP of this invention, new delamination was produced first at point C, but its resistance was about 76 kg, which was 2.5 times higher than that of the comparative FRP. Furthermore, the propagation of the delamination was suppressed by the stitch portion and, unlike the comparative FRP, the delamination did not propagate at a stretch. When the stitch yarns were broken, new delamination was produced again, but similarly to the above, it was suppressed by the next stitch portion and did not propagate at a stretch.

EXAMPLE 4

The FRP of this invention in EXAMPLE 3 to which no aluminum plate was attached was subjected to delamination by pulling the vertex in the direction vertical to the plate. Then, when the portion of broken stitch yarns was observed from the surface of the plate (from the side opposite to the surface of delamination), "KEVLAR"- 49 used as the stitch yarns appeared clear yellow, and the color difference was observed between the portion of broken stitch yarns and the portion of unbroken stitch yarns. Such a phenomenon can be attributed to the fact that, in the portion of broken stitch yarns, fine cracks are formed in the resin present in the portion or surroundings and the diffused reflection of light occurs. That is, because of presence of the stitch yarns, a stress is concentrated on this portion and cracks are produced in a localized manner (if there were no stitch yarns, the cracks would occur throughout the surface). This indicates a possibility that, when the reinforcing fiber material of this invention is used, the faults developed within the interior can be found from a color change of stitch yarns observed from the exterior even when a CFPP which is black and whose interior is difficult to observe is used.

What is claimed is:

1. A fiber material for reinforcing plastics, which comprises:
    (1) a plurality of first woven fabrics comprised of multifilament yarns of carbon fibers having a twist number of at most 20 T/m and a cross-sectional area of 0.07 to 3.5 mm² which extend in two directions including the longitudinal direction and the transverse direction intersecting therewith at a substantially right angle,
    (2) a plurality of second woven fabrics comprised of multifilament yarns of carbon fibers having a twist number of at most 20 T/m and a cross-sectional area of 0.07 to 3.5 mm² which extend in two directions including directions having angles of (25-65) degrees and −(25-65) degrees relative to the longitudinal direction, wherein said first and second woven fabrics, each in the form of a set consisting of one to several woven fabrics, are laminated alternately with each other in the same longitudinal direction, and
    (3) continuous stitch yarns integrating all the above laminated first and second woven fabrics in a single chain stitching along the longitudinal direction of the fiber material, in a manner of repeatedly passing through the woven fabrics in the direction of lamination thereof with a passing length of 0.9 to 1.1 times the thickness of the fiber material for a reinforcing plastics, wherein said continuous stitch yarns are multifilament yarns composed of reinforcing fibers selected from the class consisting of glass fibers and polyaramide fibers having a cross-sectional area of 0.01 to 0.25 mm², an elongation at break greater than that of said carbon fibers in the woven fabrics and a thermal shrinkage at 120 degrees C. of not higher than 2%.

2. A fiber material as set forth in claim 1, wherein the first and second woven substrates are woven fabrics having a weave selected from the group consisting of noncrimp fibrous structure, plain weave, twill weave and satin weave.

3. A fiber material as set forth in claim 1, wherein the weave slide resistance of the woven fabric ranges from 40 to 600 g/cm.

4. A fiber material as set forth in claim 3, wherein the yarn slippage resistance of the woven fabric is 100 to 500 g/cm.

5. A fiber material as set forth in claim 1, wherein the woven fabric is impregnated with an uncured resin to form a prepreg.

6. A fiber material as set forth in claim 5, wherein the resin is selected from the group consisting of an unsaturated polyester resin, an epoxy resin, a phenol resin and a polyimide resin.

7. A fiber material as set forth in claim 5, wherein the resin is 35 to 60% by volume fraction.

8. A fiber material as set forth in claim 7, wherein the resin is 40 to 55% by volume fraction.

9. A fiber material as set forth in claim 1, wherein the reinforcing fibers comprising the woven fabrics have substantially no twist.

10. A fiber material as set forth in claim 1, wherein the reinforcing fibers comprising the woven fabrics are multifilament yarns of carbon fiber and the stitch yarns are multifilament yarns selected from the group consisting of glass fiber and polyaramide fiber.

11. A fiber material as set forth in claim 1, wherein the direction of the stitch yarns has an angle of −15 to 15 degree relative to the direction of lamination of the woven fabrics.

12. A fiber material as set forth in claim 11, wherein the direction of stitch yarns has an angle of −5 to 5 degree relative to the direction of lamination of the woven fabrics.

13. A fiber material as set forth in claim 11, wherein the direction of stitch yarns has an angle of substantially zero degree relative to the direction of lamination of the woven fabrics.

14. A fiber material as set forth in claim 1, wherein both the stitch length of stitch yarns and the interval between adjacent stitch yarns are 2 to 30 mm.

15. A fiber material as set forth in claim 1, wherein the passing length of stitch yarns is substantially the same as the thickness of a fiber reinforced plastic molding.

16. A fiber material as set forth in claim 1, wherein the stitch density of stitch yarns is varied within the surface.

17. A fiber material as set forth in claim 1, wherein the stitch yarn are reinforcing fibers having a thermal shrinkage at 180 degrees C. of not higher than 1%.

* * * * *